United States Patent [19]

Tults

[11] Patent Number: 5,374,960
[45] Date of Patent: Dec. 20, 1994

[54] AUXILIARY VIDEO INFORMATION CODE CORRECTION IN SYNC-SUPPRESSION TYPE SCRAMBLED VIDEO SIGNALS

[75] Inventor: Juri Tults, Indianapolis, Ind.

[73] Assignee: Thomson Consumer Electronics, Inc., Indianapolis, Ind.

[21] Appl. No.: 48,159

[22] Filed: Apr. 15, 1993

[51] Int. Cl.⁵ .............................................. H04N 7/087
[52] U.S. Cl. .................................. 348/466; 348/464; 348/478; 371/31
[58] Field of Search ............... 348/466, 476, 478, 479, 348/607, 464; 371/31; H04N 7/08, 7/087

[56] References Cited

U.S. PATENT DOCUMENTS

| | | | |
|---|---|---|---|
| 4,318,128 | 3/1982 | Sauvanet | 348/466 X |
| 4,349,904 | 9/1982 | Janssen et al. | 371/31 X |
| 4,470,065 | 9/1984 | Reitmeier | 348/466 X |
| 5,287,185 | 2/1994 | Cho et al. | 371/31 X |

Primary Examiner—Mark R. Powell
Attorney, Agent, or Firm—Joseph S. Tripoli; Peter M. Emanuel; Robert D. Shedd

[57] ABSTRACT

A system for processing auxiliary video information, such as closed caption information, includes capability for detecting invalid parity errors that may be created by video signal distortion effects caused by sync suppression video signal scrambling. The sync suppression distortion does not affect the video display but may modify the parity bit of the second of two closed caption characters in each occurrence of line 21 of field 1 causing invalid parity errors. Parity errors in the first character, which is unaffected by the sync suppression distortion, indicate whether valid parity errors exist in the second character. If no parity errors occur in the first character, parity errors that occur in the second character are considered to be invalid.

17 Claims, 6 Drawing Sheets

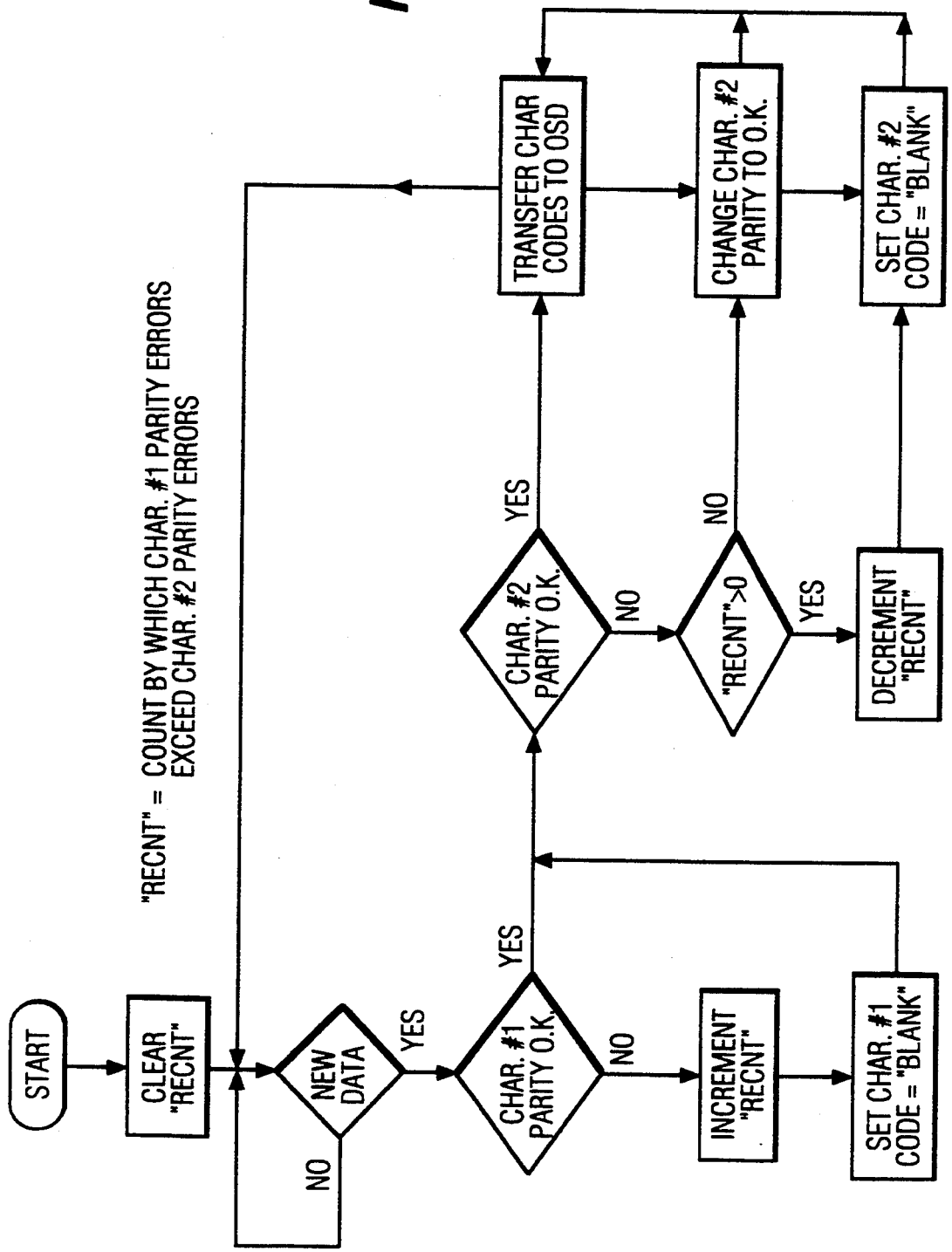

AUXILIARY VIDEO INFORMATION CODE CORRECTION IN SYNC-SUPPRESSION TYPE SCRAMBLED VIDEO SIGNALS

FIELD OF THE INVENTION

The present invention involves video signal processing systems that include capability for decoding auxiliary video information such as closed caption data.

Background

Video signals may be encoded to prevent unauthorized viewing of the video information. Encoding, sometimes referred to as "scrambling", is useful in applications such as "pay-per-view" programming. One approach to scrambling is to suppress horizontal synchronizing pulses by reducing the amplitude of the sync pulses. Reducing the pulse amplitude makes it impossible for the video receiver to synchronize the video display to the video signal. As a result, the video receiver cannot extract the video program from the scrambled video signal.

Sync signal suppression may be accomplished by reducing the video RF carrier amplitude by a fixed factor, e.g. 6 to 10 dB, during a suppression "window" that spans the sync pulse interval. The encoded signal is decoded by increasing the amplitude of the modulated RF signal during an "expansion" window that also spans the sync interval. The signal amplification during the expansion window equals the amplitude reduction during the suppression window. The distortion caused by sync suppression will be eliminated completely only if the suppression and expansion windows coincide.

It is extremely unlikely that the suppression and expansion windows will coincide precisely. Video signal regulatory standards such as those promulgated by the United States Federal Communications Commission (FCC) do not specify requirements for sync suppression encoding. As a result, the timing and duration of the suppression window depends on the particular encoding equipment being used. Variations in decoding systems further decreases the likelihood that the encoding and decoding windows will coincide precisely. Encoding and decoding systems may include adjustments to modify window timing. It is unlikely, however, that precise coincidence of the suppression and expansion windows can be achieved consistently in every system configuration.

If the encoding and decoding windows are not coincident, remnants of the suppression distortion remain in the video signal after decoding. For example, the expansion window may occur within the suppression window as shown in FIG. 1 causing the suppression interval to extend beyond both the left and right edges of the expansion interval. The portions of the video signal that are within the suppression window and outside the expansion window remain distorted, i.e. with suppressed RF amplitude, after expansion. Two distorted portions are associated with each sync pulse, i.e. one on either side of each sync pulse as shown in FIG. 1. The distorted portions are labeled "rabbit ear" in FIG. 1.

For the window timing shown in FIG. 1, the signal level during the "rabbit ear" intervals is at, or greater than, the maximum video signal level of 100 IRE because suppressing the RF carrier increases the IRE level of the video signal. This is better understood by referring to the relationship between the RF carrier and the video signal that is depicted in FIG. 1. More specifically, IRE levels increase as the video signal level approaches the mid-point of the RF carrier amplitude (indicated by the dashed line at the top of FIG. 1). Decreasing the amplitude of the RF carrier in the suppression window during encoding causes the encoded portion of the video signal waveform to move toward the mid-point of the RF carrier amplitude (broken line at the top of FIG. 1). As a result, the IRE level increases during the suppression window. For example, suppression of 6 to 10 dB causes video signal levels during the active video interval within the suppression window to exceed 50 IRE. Increasing the RF carrier amplitude during decoding causes the video signal within the expansion window to move away from the mid-point of the RF carrier amplitude eliminating the IRE level increase. However, encoded signal portions that are not decoded remain at increased IRE levels.

The visible video display is not directly affected by distortion during the "rabbit ear" intervals. Testing of sync suppression systems indicates that the edges of the suppression and expansion windows will occur within approximately 4 μs of the corresponding edges of the active video interval in each horizontal line interval. This timing ensures that any "rabbit ear" effect is within the overscan region of the video display. As a result, the "rabbit ear" effect does not produce visible effects in video lines that are included in the visible display area.

Distortion during the "rabbit ear" intervals may corrupt auxiliary video information, such as closed caption data, that is included in the video signal. As specified in the FCC closed captioning standard, closed caption data is included during line 21 of field 1. Closed caption data is not displayed directly because line 21 is within the vertical blanking interval. The data is extracted from the video signal and decoded. Decoded data is displayed via an on-screen display (OSD) unit in the video system that merges the decoded data into the normal video display. As specified in the FCC standard, the information in the last half of each line 21 interval includes 16 binary bits representing two 8 bit binary words. Each 8-bit word includes 1 parity bit and 7-bits coded in ASCII format representing one closed caption character. The last bit in each line 21 interval is the parity bit for the second character. A "rabbit ear" interval occurring during the end of the active video interval in line 21 may corrupt the parity bit of the second closed caption character causing incorrect decoding of the closed caption data.

The problem may be better understood by comparing the timing of the "rabbit ear" intervals as shown in FIG. 1 with the timing of closed caption data as shown in FIG. 2. As described above, a "rabbit ear" may occur during the last 4 μs of the active video interval in the horizontal line interval preceding the horizontal sync pulse ("rabbit ear" on the left side of FIG. 1). In FIG. 2, the last closed caption data bit, i.e. the parity bit for character 2, also occurs during the last 4 μs of the active video interval. Thus, the signal level during a "rabbit ear" interval can interfere with the parity bit.

A signal level of 50 IRE during a closed caption bit interval in line 21 is interpreted by the closed caption data decoder as a logic 1. As described above, the signal level during a "rabbit ear" interval is shifted to levels greater than 50 IRE by the suppression operation. Thus, the interference between the "rabbit ear" and the parity bit will cause the decoded parity bit to be logic 1 regardless of the intended parity bit signal level. Spurious parity errors result, i.e. a parity error occurs for character 2 when the character code for character 2 is correct.

Repeated occurrence of the "rabbit ear" intervals causes the parity bit for the second closed caption character in every line 21 to be "stuck" at logic 1. As a result, every other displayed closed caption character, i.e. approximately 50% of the closed caption display, is associated with a parity bit equal to logic 1. Assuming that approximately 50% of the character 2 codes should have a correct parity bit equal to logic 0, approximately 25% of the displayed closed caption characters will produce a spurious parity error. An OSD unit may replace a character code that causes a parity error with a particular "substitute" character code, e.g. the character code for a "blank" character. Thus, incomplete decoding of sync suppression video signal scrambling may cause approximately 25% of closed caption characters to erroneously be displayed as blank characters.

SUMMARY OF THE INVENTION

In accordance with the principles of the present invention, a system for processing a television signal including an auxiliary information component evaluates the auxiliary information to determine when errors occur in the auxiliary information, modifies the auxiliary information when valid errors occur, and substantially prevents modification of the auxiliary information when invalid errors occur. Invalid errors exist when errors are not detected in a first binary word included in the auxiliary information and errors are detected in a second binary word.

BRIEF DESCRIPTION OF THE DRAWING

An embodiment of the invention will be described with reference to the accompanying Drawing in which:

FIG. 5 shows a flowchart useful for understanding the operation of the system shown in FIG. 3.

Detailed Description

Figure 3:
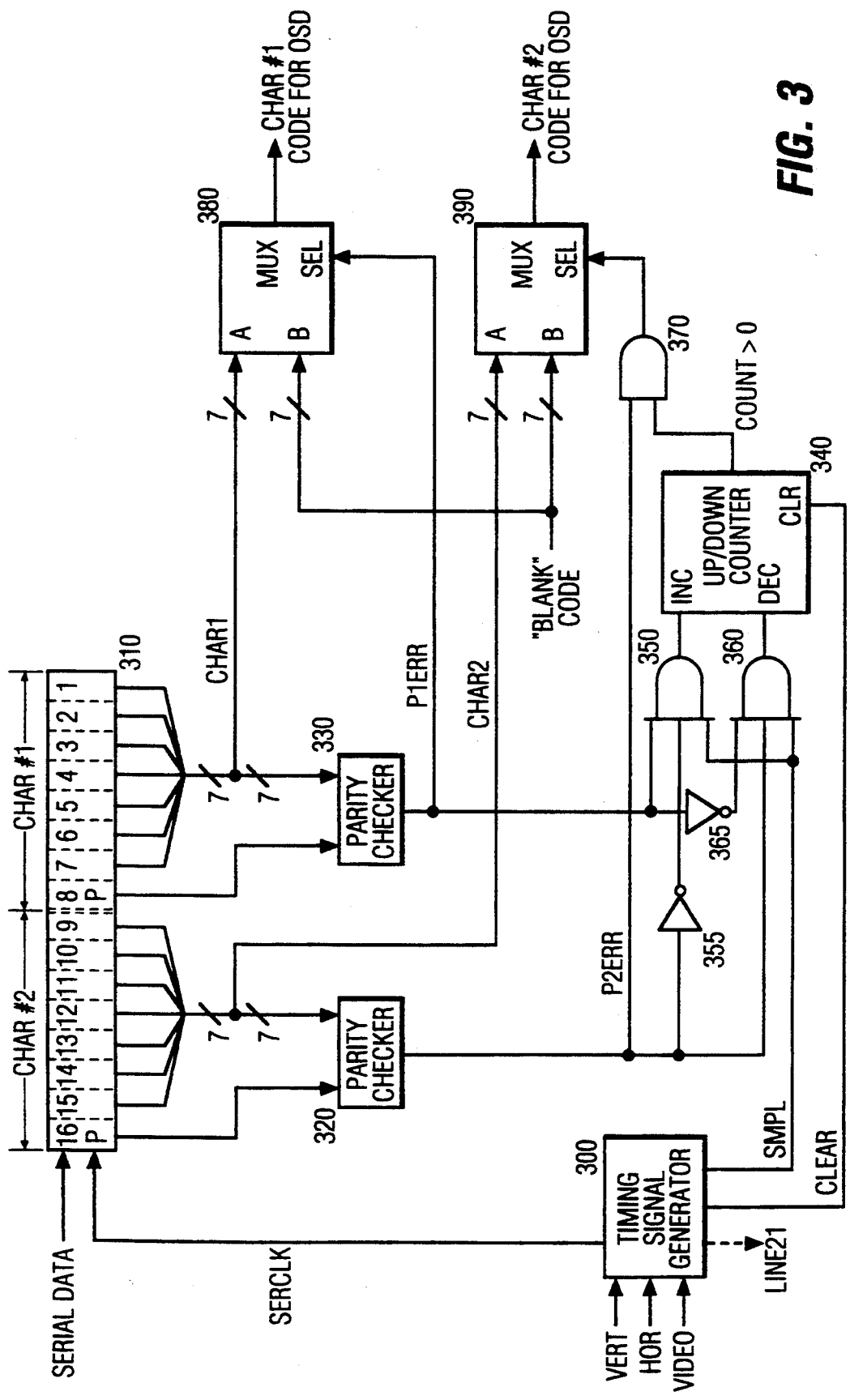
FIG. 3 shows a block diagram of a portion of a video signal processing system constructed in accordance with principles of the present invention.

In the system shown in FIG. 3, signal SERIAL DATA provides serial binary data that is extracted from the video signal. Data extraction is accomplished using a data slicer (not shown in FIG. 3) that converts video signal levels greater than and less than a threshold level, referred to as a slicing level, into binary logic 1 and logic 0 levels, respectively. The 16-bits of serial closed caption data in one occurrence of line 21 are clocked into 16-bit register 310 in FIG. 3 in response to 16 clock pulses on clock signal SERCLK.

Figure 1:
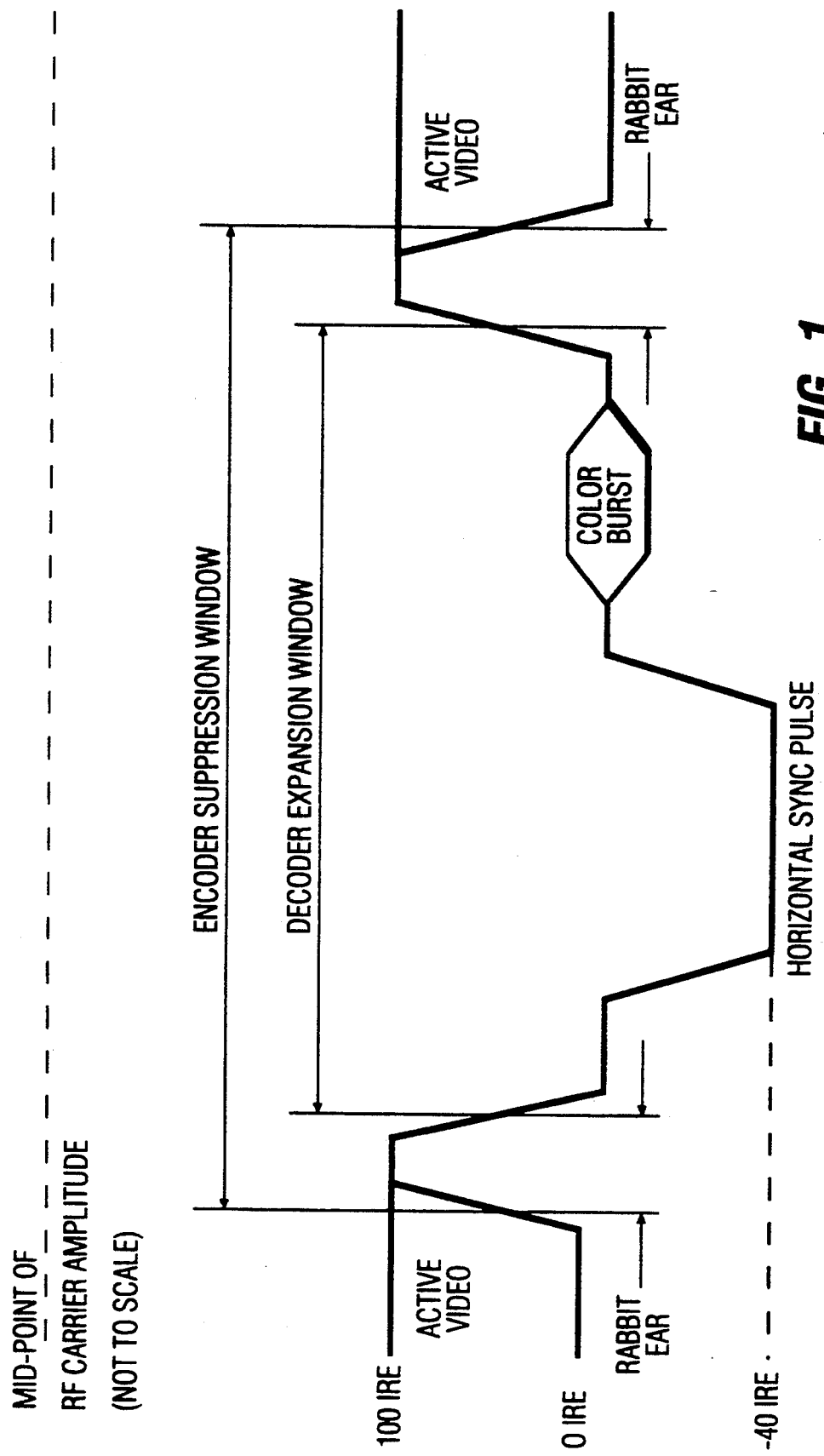
FIG. 1 shows a video signal waveform that illustrates an aspect of the problem that is addressed by the present invention.
Figure 2:
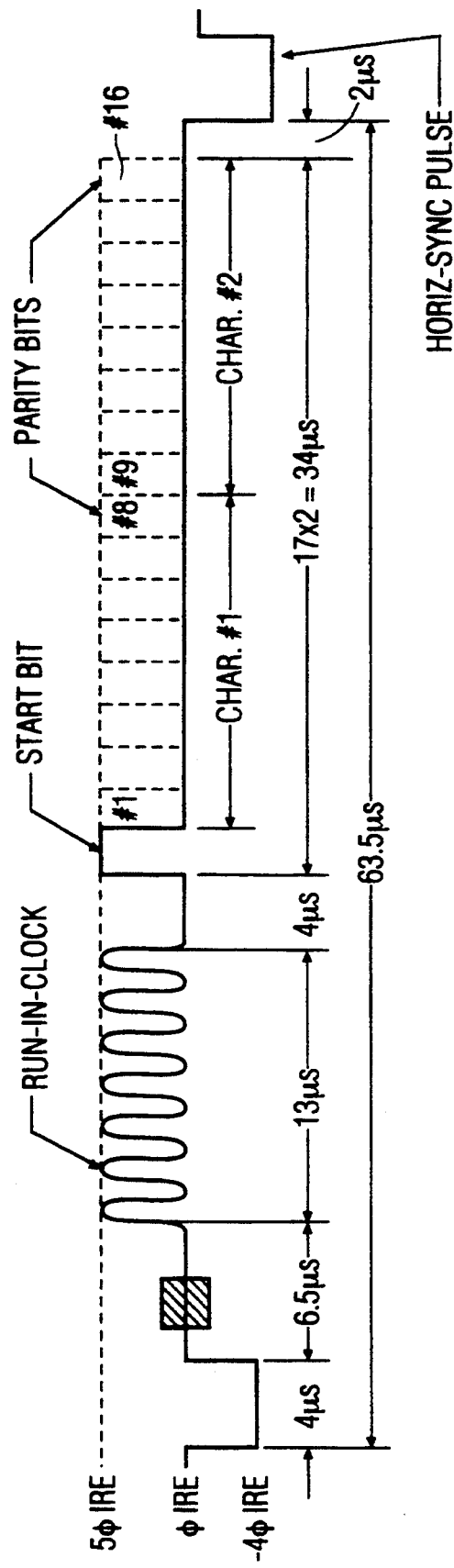
FIG. 2 shows a waveform of a video signal that includes closed caption data illustrating another aspect of the problem.

Signal SERCLK is generated by timing signal generator 300 during the portion of line 21 when closed caption data is occurring in the video signal (see FIG. 2). Generator 300 determines when line 21 is present in the video signal by counting horizontal lines in the video signal as indicated by horizontal sync pulses in signal HOR. The horizontal line count is initialized at the beginning of a video field as indicated by a vertical sync pulse on vertical sync signal VERT. Signals VERT and HOR are produced by deflection circuitry in a video system. A phase shift may exist between sync signals produced by the deflection circuitry and the timing of the actual video signal VIDEO. A sync separator in generator 300 produces a separated sync signal from composite video signal VIDEO that is used to synchronize the generation of signal SERCLK to the actual timing of the closed caption data interval within line 21.

The 16 bits of data in register 310 are designated bits 1 to 16 in FIG. 3. Bits 7-1 contain the character code for the first closed caption character in line 21 (labeled "CHAR #1" in FIGS. 2 and 3) and bits 15-9 are the character code for the second closed caption character (labeled "CHAR #2"). Bits 16 and 8 are the parity bits (labeled "P") for the second and first characters, respectively.

Sixteen parallel outputs from register 310 convert the serial data into parallel data that is coupled to parity checkers 320 and 330. The character code and corresponding parity bit for each character are coupled to respective parity checkers 320 and 330. The parity checkers evaluate the character code and parity bits for first and second characters and generate respective parity error signals P1ERR and P2ERR. When a parity error signal is at logic 1, a parity error exists in the corresponding character code.

The parity error information is used as described below to control output muxes 380 and 390 for selectively coupling either the character codes in register 310 or a substitute character code, such as the code for a "blank", to an on-screen display (OSD) processor (not shown in FIG. 3). Signal P1ERR is assumed to accurately indicate when an error occurs in character 1 because the above-described "rabbit ear" effect does not affect character 1. Thus, signal P1ERR controls mux 380 directly as follows. Signal P1ERR at logic 0 (character 1 code correct) causes mux 380 to couple the character 1 code at the A of mux 380 to the output of mux 380 and to the OSD processor. For signal P1ERR at logic 1 (character 1 code error), the code for a "blank" at the B input of mux 380 is coupled to the output of mux 380 and to the OSD processor.

For character 2, the "rabbit ear" may corrupt the parity bit of character 2 as explained above causing the parity check results indicated by signal P2ERR to be incorrect. The validity of signal P2ERR, and thus the validity of the code for character 2, is evaluated as explained below to determine when a parity error in character 2 is likely to be a spurious result caused by the "rabbit ear" effect. A spurious parity error is ignored and the code for character 2 ("A" input of mux 390) is coupled to the output of mux 390 and to the OSD processor. A valid parity error in the character 2 code causes the "blank" code at input B of mux 390 to be coupled to the output of mux 390 and to the OSD processor.

The evaluation of the validity of parity errors in character 2 is based on the occurrence of parity errors in character 1. More specifically, it is assumed that the likelihood of a parity error occurring in character 1 and character 2 is the same. In addition, because character 1 is unaffected by the "rabbit ear" effect, character 1 parity provides a reliable indication of when valid parity errors are occurring. For example, a strong video signal, e.g. a cable television (CATV) signal, is unlikely to produce valid parity errors in general, and in character 1 in particular. Thus, a lack of parity errors in character 1 indicates that parity errors in character 2 are likely to be spurious errors caused by the "rabbit ear" effect. If the signal is weak or noisy, valid parity errors are likely to occur in either character. Thus, parity errors occurring in character 1 indicates that parity errors in character 2 may be valid.

The embodiment shown in FIG. 3 implements the described approach to determining the validity of character 2 parity errors. First, if no parity error exists in character 2 (signal P2ERR at logic 0), the character 2 code is presumed to be correct. In FIG. 3, signal P2ERR at logic 0 causes the select signal for mux 390 to be logic 0 via AND gate 370. Mux 390 responds by coupling the character 2 code at the "A" input of mux 390 to the OSD processor. Thus, the character 2 code passed to the OSD processor is unchanged when there is no parity error in character 2.

When a parity error does exist in character 2, signal P2ERR is at logic 1 causing the value of the select signal for mux 390 at the output of AND gate 370 to be determined by circuitry including up/down counter 340 and gates 350 to 365. This circuitry evaluates the validity of the parity error in character 2. Counter 340 is a three bit counter that increments and decrements a count value in response to pulses at respective inputs INC and DEC. The count value records the occurrence of parity errors in characters 1 and 2 as follows.

The count value is initialized to 0 in response to a pulse at input CLR of the counter. In FIG. 3, signal CLEAR from timing signal generator 300 provides the initializing pulse when the system first begins processing closed caption data or when the source of the video signal changes.

The output of counter 340 is a single bit signal coupled to an input of AND gate 370 that is at logic 1 only when the count value is greater than the initial value of 0. A logic 1 at the output of counter 340 indicates that parity errors in character 2 are valid and causes signal P2ERR to provide the selection signal for mux 390. As a result, a logic 1 on signal P2ERR (a parity error) causes the "blank" code at the B input of mux 390 to be coupled to the OSD processor. A logic 0 (no error) causes the character 2 code to be coupled to the OSD processor.

Figure 4:
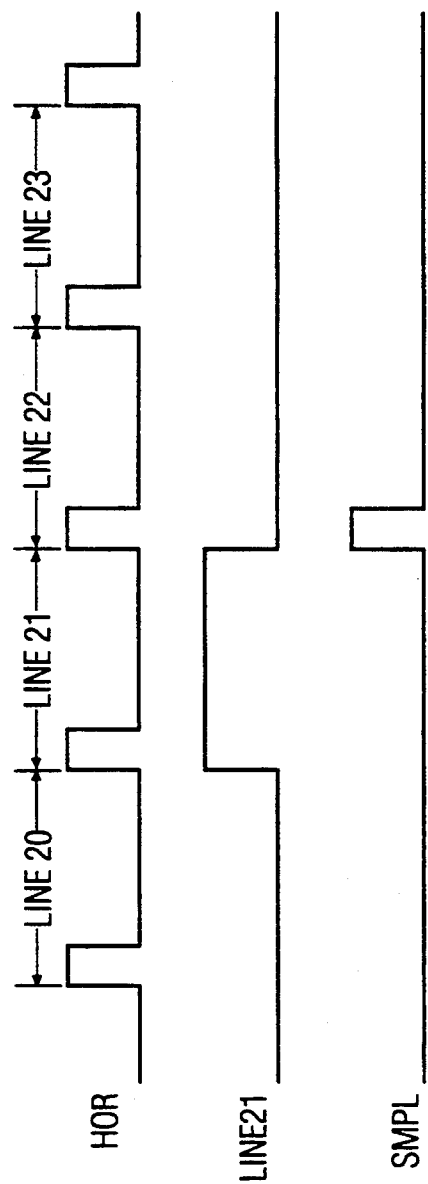
FIG. 4 shows signal waveforms useful for understanding the operation of the system shown in FIG. 3.

The count value is incremented and decremented in response to parity errors in characters 1 and 2. Pulses to logic 1 at the output of AND gates 350 and 360 cause the count value to increment and decrement, respectively, if the count value is between the count value limits of 0 and 7 (the minimum and maximum count values possible with a 3-bit counter). The counter inhibits incrementing when the count value is 7 and inhibits decrementing when the count value is 0, i.e. the counter design does not permit "wrap around". The outputs of AND gates 350 and 360 can pulse to logic 1 only during an interval after the end of line 21 that is defined by sampling signal SMPL from timing signal generator 300. This timing ensures that parity error signals P2ERR and P1ERR are stable before the increment or decrement signals can be generated. The timing relationship between line 21 and signal SMPL is shown in FIG. 4.

An increment signal is generated at the output of AND gate 350 during the pulse on signal SMPL if there is a parity error in character 1 and no parity error in character 2 (signal P1ERR is at logic 1 and signal P2ERR is at logic 0). Although no parity error exists in character 2 for the present occurrence of line 21, a parity error in character 1 indicates that valid parity errors may exist in the signal, e.g. the signal is a noisy signal, and that subsequent parity errors in character 2 may be valid. The occurrence of this condition is recorded by incrementing the count value.

A decrement signal is generated at the output of AND gate 360 during the pulse on signal SMPL if there is no parity error in to character 1 and a parity error exists in character 2 (signal P1ERR at logic 0 and signal P2ERR at logic 1). The count value is decremented in response to the decrement signal if the present count value is greater than 0. A decrement signal indicates that the present parity error in character 2 may be invalid. The history of character 1 parity errors as indicated by the count value determines whether the character 2 parity error is viewed as a valid error.

A count value greater than 0 indicates that parity errors are occurring in character 1 and, therefore, that valid parity errors exist in the signal. As a result, the parity check of character 2 is presumed to be correct. The output of counter 340 is at logic 1 enabling signal P2ERR to control mux 390 via AND gate 370.

A count value of 0 indicates either that parity errors are not occurring in character 1 or that parity errors in character 1 are occurring less frequently than in character 2. In either situation, a parity error in character 2 is presumed to be invalid, i.e. the character 2 code is correct. A logic 0 is produced at the output of counter 340 causing mux 390 to couple the character 2 code to the OSD processor despite the indication that a parity error exists. If parity errors occur in characters 1 and 2 in the same occurrence of line 21, the count value is not changed. Control of mux 390 is the same as for the preceding occurrence of line 21.

The effect of the described counter arrangement is to provide a "memory" feature that records the number of errors in character 1 and recognizes only the same number of valid errors in character 2. This is in accordance with the basic assumption stated above that valid errors in character 2 are as likely as valid errors in character 1. The result is a form of statistical error processing for character 2 that effectively processes character 2 errors for strong signals, weak signals, and whether or not the "rabbit ear" effect is present. In particular, the error processing results are better for all of the various signal types than are the alternatives of either processing all character 2 errors or processing no errors. For example, processing no errors when the signal is weak and the "rabbit ear" effect is not present would result in the display of numerous incorrect characters causing a confusing closed caption display. Processing all character 2 errors when the signal is strong and the "rabbit ear" effect is present would cause numerous unnecessary blank characters.

Results similar to those produced with the apparatus shown in FIG. 3 may be achieved with a software implementation that is shown in the flowchart in FIG. 5. The procedure shown in FIG. 5 is entered at step 500 followed by initialization of the count value (identified as RECNT in FIG. 5) to 0. Step 500 is entered when closed caption data processing first begins or when the signal source changes as described above in regard to FIG. 3. At step 515, operation halts until new data, i.e. a new occurrence of line 21, is detected. The parity of character 1 is tested at step 520. A parity error in character 1 causes the count value to be incremented at step 525 and the character 1 code is set to the "blank" code at step 530. Following the completion of step 530, or if no parity error is detected at step 520, processing continues at step 540.

Parity of character 2 is checked at step 540. Correct parity for character 2 causes the transfer of the character 1 code (either the original character 1 code or the "blank" code from step 530) and the character 2 code to the OSD processor at step 545. If character 2 parity is incorrect at step 540, the count value is tested at step 550. A count value greater than 0 causes the count value to be decremented at step 560 followed by the character 2 code being set to the "blank" code at step 565, and transfer of the character codes to the OSD processor at step 545. If the count value is not greater than 0 (i.e. equal to 0) at step 550, the parity of character 2 is corrected and the character codes are transferred to the OSD processor at step 545. Following step 545, operation continues at step 515 where the procedure halts until another occurrence of line 21 is detected.

The software procedure shown in FIG. 5 may be implemented efficiently using a Motorola MC68HC05CC1 micro-processor that includes capability for processing closed caption signals. The routine shown in FIG. 5 requires only 18 bytes of ROM and one byte of RAM. The byte of RAM is required to store a count value that can be modified (initialized, incremented, and decremented).

The software approach shown in FIG. 5 provides a slightly different function than does the hardware embodiment shown in FIG. 3. In FIG. 5, the parity of each character code is evaluated sequentially, i.e. the parity of character code 1 is evaluated first followed by that of character code 2. In FIG. 3, two parity checkers evaluate the parity of both characters simultaneously. Sequential parity checking could be implemented in the system shown in FIG. 3 using only a single parity checker by evaluating the parity of each word during a different interval within line 21. However, a mux would be required to selectively couple each character code to the parity checker and additional control signals would be required.

Also, the approaches in FIGS. 3 and 5 differ in the manner in which an invalid parity error is handled. In FIG. 5, an invalid parity error for character 2 causes the parity of character 2 to be corrected at step 555 before passing the character codes to the OSD processor. In FIG. 3, the parity bits are "stripped off" and only the 7-bit character code for each character is transferred to the OSD processor. Parity correction could be included in FIG. 3 by inverting the parity bit when the count value indicates invalid parity.

The embodiments of the invention described thus far provide a solution to the problem of invalid parity errors that is applicable to a system processing either weak or strong signals. The apparatus shown in FIG. 3 operates in the same manner regardless of whether strong or weak signals are involved. Thus, it is unnecessary to detect the type of signal being received. Different modes of operation are unnecessary. User intervention is not required for adjustments such as switching modes of operation when the signal type changes. However, if the system will be processing strong signals only, the apparatus shown in FIG. 3 may be simplified significantly because errors are unlikely to occur when a strong signal is present.

Figure 6A:
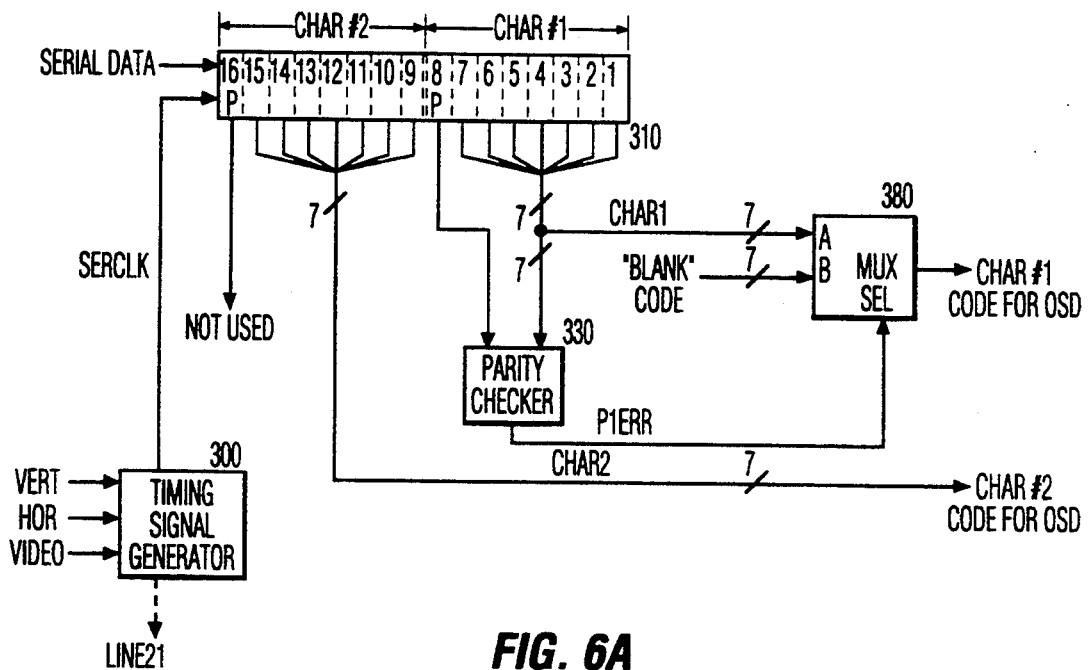
FIGS. 6A and 6B show alternative embodiments of video signal processing systems constructed in accordance with the principles of the present invention.

One approach to processing strictly strong signals is to check for parity errors in the first character only, i.e. ignore parity errors in the second character. If parity of the second character is not checked, parity checker 320, mux 390, and devices 340 to 365 may be eliminated. The character 2 code would be coupled to the OSD processor at all times. This arrangement is shown in FIG. 6A.

Figure 6B:
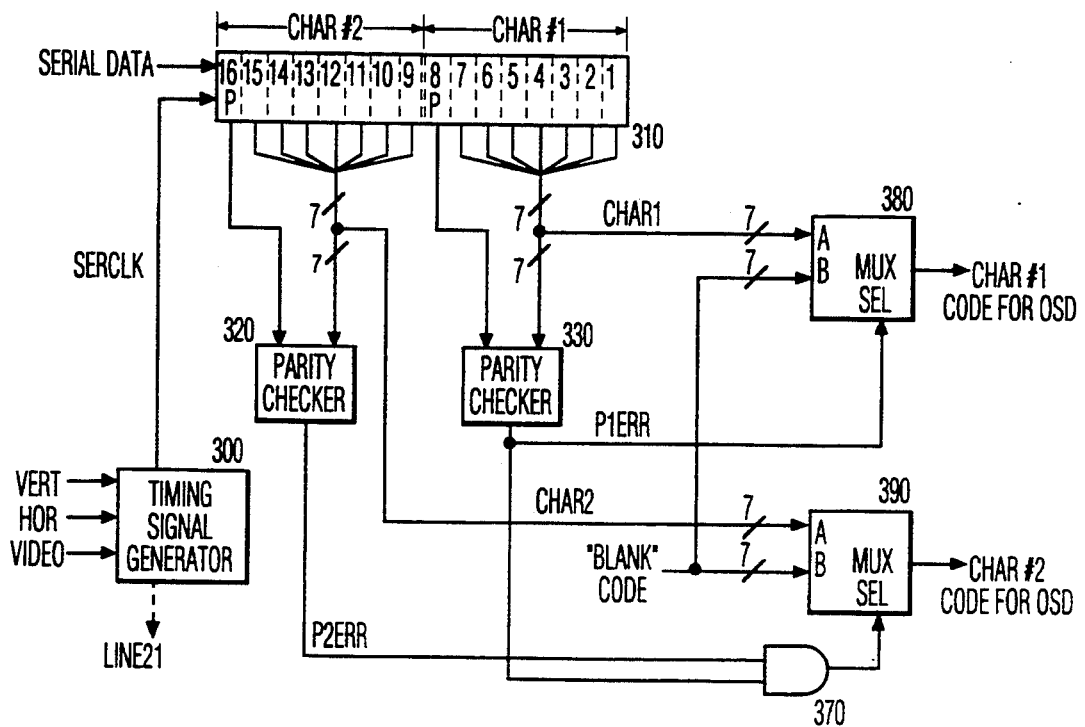

Alternatively, FIG. 3 may be modified for strong signals by generating the select signal for mux 390 from the logical AND of signals P2ERR and P1ERR using AND gate 370. This configuration, shown in FIG. 6B, causes the "blank" code to be selected only when an error is detected in both character 1 and character 2. "Statistical" processing of errors does not occur as in FIG. 3 where counter 340 records the "history" of errors in character 1. However, the approach shown in FIG. 6B does detect certain errors in character 2 while the arrangement shown in FIG. 6A detects no errors.

Other modifications to the described embodiments are possible. For example, the counter shown in FIG. 3 may be implemented using a number of bits other than the 3-bit configuration that is described. One possibility is to use a single bit operating as a "flag" bit. The flag bit would be set when a parity error in character 1 is detected. A subsequent error in character 2 would then be treated as a valid error and the flag bit would be cleared. If the flag bit is not set when a character 2 error occurs, the error in character 2 would be presumed to be invalid. A multi-bit counter such as the described 3-bit counter may provide better performance in the presence of noisy or weak signals than the single-bit approach. The counter may be further modified without departing from the principles of the present invention by changing the initialization value of the counter, reversing the role of the increment and decrement functions (i.e. increment for a character 2 error and decrement for a character 1 error), and changing the count value test condition.

Additional modifications are also possible. For example, the invention may be useful in regard to forms of auxiliary video information other than closed caption data. In particular, data associated with "Extended Data Services" applications (i.e. auxiliary video information in line 21 of field 2) may also exhibit errors caused by the "rabbit ear" effect that can be addressed by the invention. Also, the hardware and software approaches in FIGS. 3 and 5 may be combined in various ways, i.e. certain functions in hardware and others in software, to provide a system in accordance with the principles of the present invention. These and other modifications are intended to be within the scope of the following claims.

I claim:

1. In a system for processing a television signal including an auxiliary information component comprising first and second binary codes, apparatus comprising:
   means for detecting when an error exists in one of said binary codes;
   means coupled to said detection means for modifying said binary code in which an error occurs; and
   means coupled to said detection means and to said modifying means for preventing said modifying means from modifying said second binary code in response to detection of an error in said second binary code when an error is not detected in said first binary code.

2. The apparatus of claim 1 wherein said preventing means comprises a counter coupled to said detecting means for providing a count value; and said count value is initialized to an initial value when processing of said auxiliary information component begins;

said count value is changed to produce a new count value by incrementing said count value in response to detection of an error in said first binary code only, and by decrementing said count value in response to detection of an error in said second binary code only; and said new count value is compared to said initial value to determine when an error exists in said second binary code and not in said first binary code.

3. The apparatus of claim 1 wherein said first and second binary codes include respective parity bits and said detecting means comprises a parity checker.

4. The apparatus of claim 3 wherein said modifying means comprises a switch responsive to said detection means and to said preventing means for selectively replacing said one of said binary codes in which an error exists with an alternative binary code.

5. The apparatus of claim 4 wherein said first and second binary codes represent closed caption characters and said alternative binary code represents a blank character.

6. In a system for processing a television signal including an auxiliary information component comprising first and second binary words, each of said binary words including auxiliary information and error information tending to indicate whether said respective auxiliary information is correct, apparatus comprising:

means for evaluating said binary words to detect a data condition that exists when said error information indicates that said auxiliary information of said first binary word is correct and said auxiliary information of said second binary word is incorrect; and means coupled to said evaluation means for modifying said error information of said second binary word to indicate that said auxiliary information in said second binary word is correct when said data condition exists.

7. The apparatus of claim 6 wherein said error information in each binary word includes a parity bit;

said evaluating means comprises a parity checker that evaluates the parity of each binary word; and said modifying means modifies said parity bit of said second binary word to produce correct parity for said second binary word when said data condition exists.

8. The apparatus of claim 6 wherein said evaluating means comprises a counter for providing a count value; and said count value is initialized to an initial value when processing of said auxiliary information component begins;

said count value is incremented when said error information of said first binary word indicates that said auxiliary information of said first binary word is incorrect;

said count value is compared to said initial value after evaluation of said error information of said first and second binary words to detect said data condition; and said count value is decremented after said count value is compared to said initial value if said data condition is not detected.

9. In a system for processing a television signal including an auxiliary information component comprising first and second binary words, each of said binary words including respective auxiliary information and error information tending to indicate whether said respective auxiliary information is correct, apparatus comprising:

means for evaluating said error information in said first and second binary words to determine when said respective auxiliary information is correct;

means coupled to said evaluating means for modifying said auxiliary information of said second binary word when the evaluation of said error information in said second binary word indicates that said auxiliary information of said second binary word is incorrect; and means coupled to said modifying means and to said evaluating means for preventing said modifying means from modifying said auxiliary information of said second binary word when the evaluation of said error information indicates that said auxiliary information of said first word is correct and said auxiliary information of said second binary word is incorrect.

10. The apparatus of claim 9 wherein said error information in each binary word includes a parity bit;

said evaluating means comprises a parity checker for evaluating the parity of each binary word; and said modifying means replaces said auxiliary information of said second binary word with substitute auxiliary information.

11. The apparatus of claim 9 wherein said preventing means comprises a counter for providing a count value that changes in response to the evaluation of said error information by said evaluating means such that:

said count value is initialized to an initial value when processing of said auxiliary information component begins;

said count value is incremented when the evaluation of said error information indicates that said auxiliary information of said first binary word is incorrect and said auxiliary information of said second binary word is correct; and said count value is decremented when said the evaluation of said auxiliary information indicates that said auxiliary information of said first binary word is correct and said auxiliary information of said second binary word is incorrect; and said preventing means compares said count value to said initial value after evaluation of said error information of said first and second binary words to prevent said modifying means from modifying said auxiliary information of said second binary word when said count value equals said initial value.

12. In a system for processing a television signal including an auxiliary information component comprising first and second binary codes, apparatus comprising:

means for detecting an error in each of said first and second binary codes; and means coupled to said error detecting means for modifying said second binary code only if said error detection means detects an error in each of said first and second binary codes concurrently.

13. The system of claim 12 wherein said detecting means generates first and second control signals indicating the occurrence of an error in said first and second binary codes, respectively; and said modifying means comprises a logical AND function having first and second inputs for receiving said first and second control signals for generating an intermediate signal indicating when said second binary code is to be modified.

14. The system of claim 13 wherein said auxiliary information component is a closed caption signal.

15. In a system for processing a television signal including an auxiliary information component comprising first and second binary words, apparatus comprising:

means for detecting an error in said auxiliary information component; and means coupled to said detecting means for modifying said auxiliary information component in response to detection of an error; wherein said first binary word is modified by said modifying means in response to detection of an error in said first binary word, and said second binary word is not modified by said modifying means in response to detection of an error in said second binary word.

16. The system of claim 15 wherein said auxiliary information component is a closed caption signal.

17. The system of claim 15 wherein said detecting means is a parity checker; and said modifying means is a switch having a control input coupled to said detecting means for selectively replacing said first binary word with a substitute binary word in response to detection of an error in said first binary word.

* * * * *